(12) United States Patent
Ohsawa et al.

(10) Patent No.: US 8,038,027 B2
(45) Date of Patent: Oct. 18, 2011

(54) FUEL CAP AND VAPORIZED FUEL ADSORPTION CANISTER USED IN THE FUEL CAP

(75) Inventors: Hiroyasu Ohsawa, Shizuoka (JP); Takashi Sakagami, Shizuoka (JP)

(73) Assignee: Toyo Roki Seizo Kabushiki Kaisha, Shizuoka (JP)

( * ) Notice: Subject to any disclaimer, the term of this patent is extended or adjusted under 35 U.S.C. 154(b) by 970 days.

(21) Appl. No.: 11/939,576

(22) Filed: Nov. 14, 2007

(65) Prior Publication Data

US 2008/0110889 A1    May 15, 2008

(30) Foreign Application Priority Data

Nov. 14, 2006 (JP) ................................. 2006-307891

(51) Int. Cl.
*B65D 51/16* (2006.01)
(52) U.S. Cl. . 220/371; 220/303; 220/212; 220/DIG. 33; 220/571
(58) Field of Classification Search .................. 220/303, 220/304, 371, DIG. 33, 212, 571
See application file for complete search history.

(56) References Cited

U.S. PATENT DOCUMENTS

| 4,690,293 A * | 9/1987 | Uranishi et al. ............. 220/86.2 |
| 2007/0108212 A1* | 5/2007 | Nelson .......................... 220/371 |

FOREIGN PATENT DOCUMENTS

JP          7-34985          2/1995

* cited by examiner

*Primary Examiner* — Anthony Stashick
*Assistant Examiner* — James N Smalley
(74) *Attorney, Agent, or Firm* — Young & Thompson (57) ABSTRACT

The fuel cap includes an outer cap as an outer envelope, an inner cap removably fitted in the outer cap through an opening therein, a canister located in a space between the outer cap and the inner cap for adsorbing a vaporized fuel. The fuel cap closes a fuel filler port for feeding a fuel to a fuel tank. The canister adsorbs a vaporized fuel vaporized from the fuel in the fuel tank. At least one of the outer cap and the inner cap defines a communication hole communicating with the space and an exterior. The canister includes a housing; and an adsorbent accommodated therein. The housing defines, on an end surface directed to the inner cap, an inlet for vaporized fuel and on another end surface directed to the outer cap, an outlet for gas.

7 Claims, 6 Drawing Sheets

FUEL CAP AND VAPORIZED FUEL ADSORPTION CANISTER USED IN THE FUEL CAP

CROSS-REFERENCE TO RELATED APPLICATIONS

This application is based upon and claims the benefit of priority from Japanese Patent Application No. 2006-307891 filed on Nov. 14, 2006; the entire contents of which are incorporated herein by reference.

BACKGROUND OF THE INVENTION

The invention relates to a fuel cap adsorbing vaporized fuel vaporized from a fuel contained in a fuel tank and preventing leakage of the vaporized fuel to the air, and a vaporized fuel adsorption canister used in the fuel cap.

An internal combustion engine of a relevant vehicle employs a vaporized fuel adsorption canister to adsorb a generated vaporized fuel so as to prevent leakage of the vaporized fuel to the air. It is necessary for a small utility engine or a two-wheeled vehicle to prevent leakage of the vaporized fuel vaporized from the fuel contained in a fuel tank to the air while suppressing an increase in internal pressure. In this respect, Japanese Patent Application Laid-Open No. 7-34985 discloses a technique for providing a vaporized fuel adsorbing device within a fuel cap that opens or closes a fuel filler port provided at a fuel tank of a small utility engine. The fuel cap using the disclosed technique has been gradually considered.

The fuel cap of this type includes an outer cap serving as an outer envelope and an inner cap fitted into the outer cap. The inner cap is inserted in the fuel filler port and the fuel filler port is closed by a bearing surface and a fastener member. A space is defined between the outer cap and the inner cap. A compact vaporized fuel adsorption canister (hereinafter, "canister") is provided in the space, and the canister adsorbs a vaporized fuel.

However, there is a limit to the space between the outer cap and the inner cap in terms of size. Due to this, it is disadvantageously quite difficult to obtain a canister appropriately performing inflow of the vaporized fuel, adsorption of the vaporized fuel, and smooth outflow of gas after the adsorption. It is particularly required to smoothly flow out the gas from which the vaporized fuel has been adsorbed from the canister. However, the outer cap closes an outlet of the canister, which makes it disadvantageously difficult to smoothly flow out the gas from the outlet. If the outlet is closed, the internal pressure of the fuel tank disadvantageously rises.

The space between the outer cap and the inner cap has a limited height and is, therefore, flat in shape. If the canister is accommodated in the space, a housing serving as an outer envelope of the canister is forced to be flat according to the shape of the flat space. In this case, the vaporized fuel flowing into the housing circulates through only limited channels, which makes it disadvantageously difficult to uniformly use the adsorbent filled up in the housing and to thereby adsorb the vaporized fuel.

SUMMARY OF THE INVENTION

The invention is directed to a fuel cap ensuring adsorbing a vaporized fuel vaporized from a fuel contained in a fuel tank and discharging a gas free from the vaporized fuel, and a vaporized fuel adsorption canister used in the fuel cap.

The first aspect of the invention provides a fuel cap. The fuel cap includes an outer cap as an outer envelope. The fuel cap includes an inner cap removably fitted in the outer cap through an opening of the outer cap. The fuel cap includes a canister located in a space between the outer cap and the inner cap for adsorbing a vaporized fuel. The fuel cap closes a fuel filler port for feeding a fuel to a fuel tank. The canister adsorbs a vaporized fuel vaporized from the fuel in the fuel tank. At least one of the outer cap and the inner cap defines a communication hole communicating with the space and an exterior. The canister includes a housing; and an adsorbent accommodated in the housing. The housing defines, on an end surface directed to the inner cap, an inlet for a vaporized fuel to flow into the inlet. The housing defines, on another end surface directed to the outer cap, an outlet for a gas, from which the vaporized fuel has been absorbed, to flow out of the outlet. An inner surface of the outer cap and said another end surface of the inner cap having a clearance securement member interposed therebetween and located proximate to the outlet, the spacer securing a clearance between the inner surface of the outer cap and said another end surface of the inner cap.

The clearance securement member may include a projection projecting from one of the inner surface of the outer cap and said another end surface of the inner cap toward the other one thereof.

The inlet may be located at radial center portion of the housing. The outlet may be displaced radially outside of the center portion of the housing.

The clearance securement member may be positioned slightly inside of the inlet in a radial direction of the housing.

The housing may have a circumferential wall having a rib extending in a height direction of the housing, the rib projecting radially outside of the housing.

The second aspect of the invention provides a vaporized fuel adsorption canister. The canister is fitted inside of a fuel cap to open or close a fuel filler port. The canister includes a housing having an adsorbent therein. The housing has, on an end surface in a height direction of the housing, an inlet for a vaporized fuel to flow into the inlet. The housing has, on another end surface in the height direction of the housing, an outlet for a gas, from which the vaporized fuel has been adsorbed, to flow out of the outlet. Said another end surface with the inlet has, proximate to the inlet, one of a clearance securement projection and a receiver surface, the clearance securement projection projecting toward an inner surface of the fuel cap, the receiver surface being to receive a clearance securement member projecting from an inner surface-side of the fuel cap toward said another end surface. Said another end surface and the fuel cap secures a clearance therebetween.

The inlet may be formed at a radial center portion of the housing. The outlet may be displaced outward of the center portion.

The clearance securement projection may be positioned slightly inside of the outlet in a radial direction of the housing.

The housing may have a circumferential wall having a rib extending in a height direction of the circumferential wall. The rib may project radially outside of the housing.

DETAILED DESCRIPTION OF THE PREFERRED EMBODIMENTS

Embodiments of the invention will be described below in detail with reference to the accompanying drawings.

Figure 1:
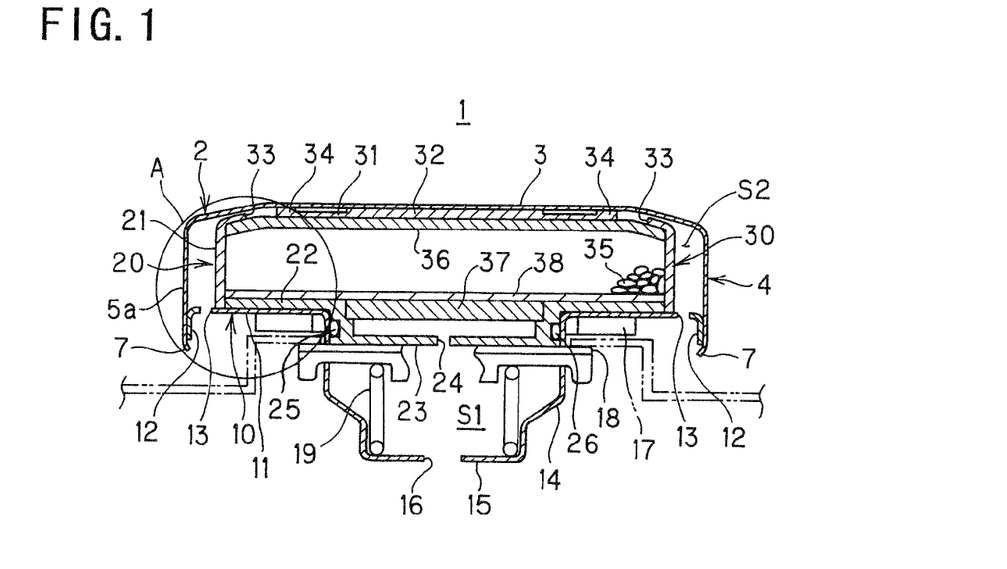
FIG. 1 is a longitudinal sectional view of a fuel cap and a vaporized fuel adsorption canister according to a first embodiment of the invention.
Figure 2:
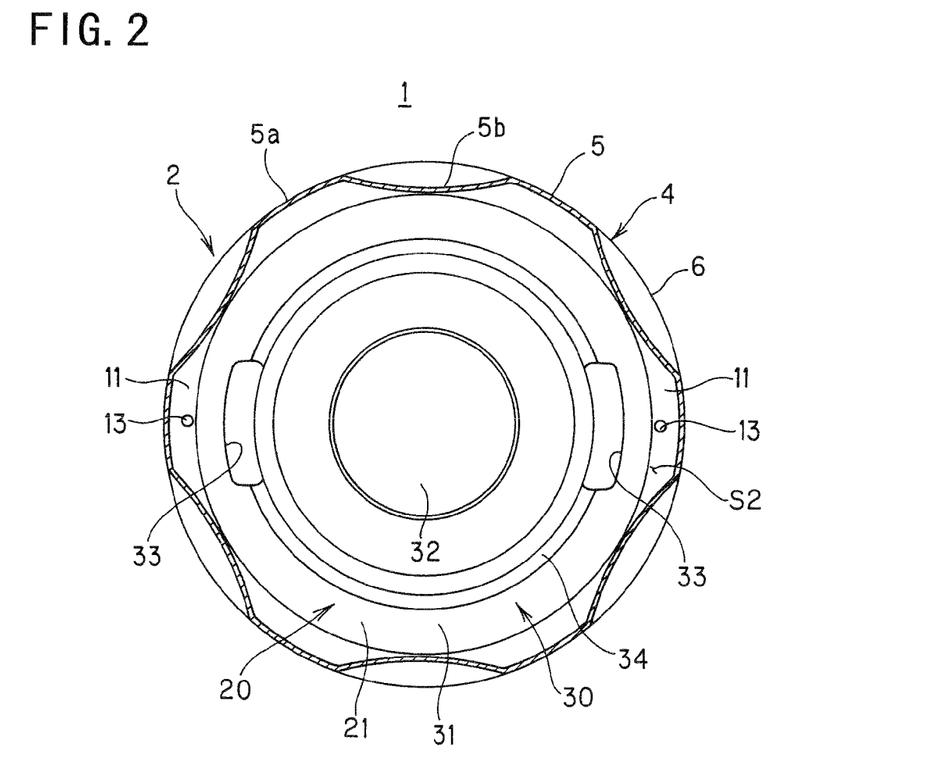
FIG. 2 is a plan view, partially in cross section, illustrating the internal structure of the fuel cap illustrated in FIG. 1.

With reference to FIGS. 1 and 2, a fuel cap 1 includes an outer cap 2 serving as an outer envelope and an inner cap 10 fitted in the outer cap 2. The fuel cap 1 opens or closes a fuel filler port of a fuel tank.

The outer cap 2 is a short cylindrical cap, with the upper portion closed by a closed surface 3 and with the lower portion open. The lower portion 6 of a circumferential wall 4 is circular. The external shape of the upper portion 5 of the circumferential wall 4 is astral by alternately arranging convexes 5a projecting radially and concaves 5b depressed toward the center. The lower end of the circular lower portion 6 has bent ends 7 slightly bent inward over its entire circumference.

The inner cap 10 includes a disc-shaped proximal end 11 and a cylindrical main body 14 projecting from the center of the proximal end 11. The proximal end 11 and the main body 14 are constituted as an integral member. The proximal end 11 is fitted in the outer cap 2 from the open lower portion of the outer cap 2. The proximal end 11 includes engagement portions 12 folded back toward the main body 14 over the entire circumference of its outer edge. The proximal end 11 also includes communication holes 13 extending through the proximal end 11 and formed at two locations slightly inward of the engagement portions 12 and symmetric about the central portion of the proximal end 11, respectively. The main body 14 has a space inside, and a proximal end 11-side of the main body 14 is open and a distal end-side thereof is covered with a distal end surface 15. The distal end surface 15 includes an introduction port 16 for the interior and the exterior of the main body 14 to communicate with each other.

The inner cap 10 includes a seal member 17 located on the rear surface of the proximal end 11 outside of the main body 14. The inner cap 10 includes a fastener member 18 projecting radially outward of the main body 14 at a position apart from the seal member 17 with a predetermined distance. The main body 14 includes springs 19 located between the distal end surface 15 and the fastener member 18 in the space S1. The springs 19 bias the fastener member 18 toward the seal member 17.

The proximal end 11 of the inner cap 10 is inserted in the outer cap 2 from the inwardly open lower portion of the outer cap 2. The engagement portions 12 on the outer circumferential edges of the proximal end 11 are engaged with the respective bent ends 7 on the lower end of the outer cap 2, being fitted to the outer cap 2. At this time, the two communication holes 13 of the proximal end 11 of the inner cap 10 are arranged to coincide with the convexes 5a in the upper portion of the astral outer cap 2, thereby adjusting a circumferential position of the inner cap 10. A space S2 defined between the outer cap 2 and the proximal end 11 of the inner cap 10 is formed inside of the outer cap 2.

A vaporized fuel adsorption canister (hereinafter, "canister") 20 adsorbing a vaporized fuel vaporized from a fuel contained in the fuel tank is located in the space S2.

As illustrated in FIG. 1, in the fuel cap 1, the distal end surface of the fuel filler port of the fuel tank indicated by a two-dot chain line is positioned between the seal member 17 and the fastener member 18. The fuel cap 1 closes the fuel filler port by holding the distal end surface of the fuel filler port between the seal member 17 and the fastener member 18. In this case, the fastener member 18 is urged by the springs 19 located inside of the main body 14, being pressed against the distal end surface of the fuel filler port. The seal member 17 is tightly fitted to the distal end surface of the fuel filler port, thereby sealing fitted surfaces of the seal member 18 and the distal end surface of the fuel filler port.

The canister 20 is located in the space S2. An inlet 24 is directed toward the inner cap 10 inserted into the fuel filler port. Outlets 33 are directed toward the closed surface 3 of the outer cap 2. As illustrated in FIG. 2, the concaves 5b in the upper portion 5 of the circumferential wall 4 of the outer cap 2 hold a circumferential wall of the canister 20 to fixedly locate the canister 2 in the space S2.

The canister 20 includes a housing 21 and activated carbon 35 serving as an adsorbent and accommodated in the housing 21. The housing 21 includes a casing 30 and a cap 22 that closes the open end of the casing 30.

The casing 30 is a short cylindrical casing. One end of the casing 30 in a height direction of the casing 30 is closed by a top surface 31 and the other end thereof is open. The top surface 31 of the casing 30 includes a circular abutting surface 32 at its center. The abutting surface 32 abuts against the inner surface of the closed surface 3 of the outer cap 2. The top surface 31 includes the outlets 33 extending through the casing 30 slightly inward of the outer circumferential edge of the casing 30. As illustrated in FIG. 2, the outlets 33 are elongate holes extending in a circumferential direction of the top surface 31. The outlets 33 are located at two locations symmetric about the center of the top surface 31, respectively. The outlets 33 allow a gas to flow out of the canister 20, the gas having passed through the canister 20, the activated carbon 35 having adsorbed the vaporized fuel from the gas. In the first embodiment, the case where the outlets 33 are formed at two circumferential positions, respectively is described. However, the embodiment is not limited to the instance and the outlets 33 may be located at three or more locations apart from one another in the circumferential direction.

Figure 3:
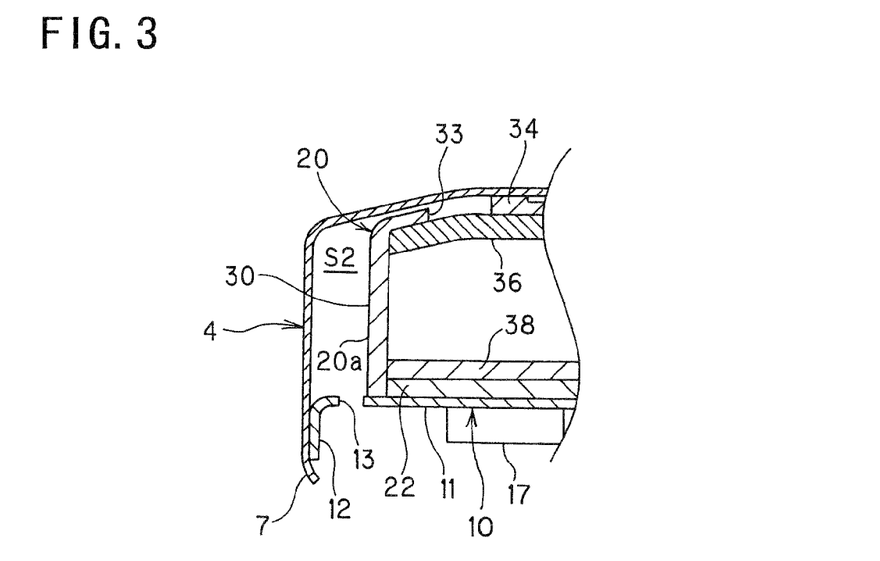
FIG. 3 is an enlarged view of a part A of the fuel cap illustrated in FIG. 1.

The top surface 31 of the casing 30 includes a ring-shaped clearance securement projection (hereinafter, "projection") 34 as a spacer located inside of the outlets 33. As illustrated in FIG. 3, the projection 34 secures a clearance between the top surface 31 of the casing 30 and the outer cap 2 proximate to each of the outlets 33, thereby preventing the outlets 33 from being closed by the outer cap 2. To effectively fulfill the function of the projection 34, the outer circumferential edge of the projection 34 contacts with the inner edge of each outlet 33.

The disc-shaped cap 22 includes an insertion portion 23 projecting from the central surface of the cap 22. The insertion portion 23 is inserted in the main body 14 of the inner cap 10. The distal end surface of the insertion portion 23 has, at the center, the inlet 24 having the vaporized fuel to flow therein. The outer circumferential surface of the insertion portion 23 includes a circumferentially extending groove 25 on its outer circumference. An O-ring 26 is fitted in the groove 25. The O-ring 26 seals the outer circumferential surface of the insertion portion 23 and the inner surface of the main body 14 of the inner cap 10 when the insertion portion 23 is inserted into the main body 14.

The casing 30 and the cap 22 constitute the housing 21. The outer circumferential edge of the cap 22 is welded to the lower end of the circumferential wall of the casing 30 by ultrasonic welding or the like, and the cap 22 closes the open end of the casing 30.

The housing 21 contains therein the activated carbon 35 held between upper and lower pads 36 and 38 in the housing 21.

The casing 30-side pad 36 is arranged along the inside surface of the top surface 31 of the casing 30. On the cap 22 side, two pads 37 and 38 are arranged to be superimposed. One pad 37 is located inside of the insertion portion 23 of the cap 22. The external shape of the pad 37 is almost identical with the insertion portion 23 in inside diameter. The pad 37 is located in the insertion portion 23 at a stage apart from the distal end surface 15 at a predetermined distance. Arrangement of the pad 37 at this stage effectively prevents the inlet 24 on the distal end surface 15 from closing the pad 37. The external shape of the other pad 38 is substantially identical with the circumferential wall of the casing 30 in inside diameter. The pad 38 is located along the internal surface of the cap 22. The activated carbon 35 is contained in the housing 21 between the pads 36 and 38 without a clearance.

When the canister 20 is disposed in the space S2, the outlets 33 on the top surface 31 of the casing 30 coincide with the convexes 5a in the upper portion of the astral outer cap 2 and the communication holes 13 formed in the proximal end 11 of the inner cap 10 in terms of circumferential positions. Alternatively, the outlets 33 may coincide with the concaves 5b in terms of circumferential positions.

The fuel cap 1 configured as stated above adsorbs the fuel from the vaporized fuel and allows the gas free from the vaporized fuel to discharge into the air with the fuel cap 1 closing the fuel filler port of the fuel tank, in the following manner.

First, the fuel contained in the fuel tank is evaporated into the vaporized fuel. The vaporized fuel is introduced from the introduction port 16 formed in the distal end surface 15 of the main body 14 constituting the inner cap 10 into the internal space S1 of the main body 14. The O-ring 26 seals the clearance between the insertion portion 23 of the cap 22 and the main body 14 of the inner cap 10. The O-ring 26 prevents invasion of the vaporized fuel into the space S2.

Next, the vaporized fuel flows into the housing 21 of the canister 20 from the inlet 24. The vaporized fuel flowing into the housing 21 moves to the outlets 33 formed in the top surface 31 of the casing 30 while the activated carbon contained in the housing 21 adsorbs the vaporized fuel. In the canister 20, the inlet 24 is located at the center of the cap 22. On the other hand, the outlets 33 are arranged slightly inward of the outer circumferential edge of the top surface 31. The outlets 33 are displaced radially outward from the center. This displacement permits the vaporized fuel to move from the inlet 24 to the outlets 33 so as to diffuse in the canister 20. As a result, the vaporized fuel is adsorbed not by a specific part of the activated carbon 35 contained in the housing 21 but by entirety of the carbon 35 by uniformly using the carbon 35.

The gas from which the activated carbon 35 has adsorbed the vaporized fuel flows from the outlets 33 into the space S2. At this time, the projection 34 secures the clearance between the top surface 31 of the casing 30 and the outer cap 2 as illustrated in FIG. 3 in detail. Due to this, the gas smoothly flows into the space S2 while the outlets 33 are not closed. The ring-shaped projection 34 also functions to prevent the gas from moving toward the center of the canister 20. The projection 34 introduces the gas to the clearance between the circumferential wall of the canister 20 and the outer cap 2. The outlets 33 are arranged to coincide with the communication holes 13 formed in the proximal end 11 of the inner cap 10 inside of the convexes 5a of the outer cap 2 in the circumferential direction of the fuel cap 1. This arrangement allows the gas flowing from the outlets 33 to smoothly travel to the communication holes 13.

Thereafter, the clean gas that does not contain the vaporized fuel is discharged from the communication holes 13 into the air.

In this manner, the outlets 33 formed in the housing 21 of the canister 20 and the communication holes 13 formed in the proximal end 11 of the inner cap 10 are arranged to coincide with the convexes 5a on the circumferential wall 4 of the outer cap 2 in the circumferential direction of the fuel cap 1. Alternatively, the communication holes 13 may be arranged to coincide with the concaves 5b.

The second embodiment of the invention is described next with reference to FIG. 4.

Figure 4:
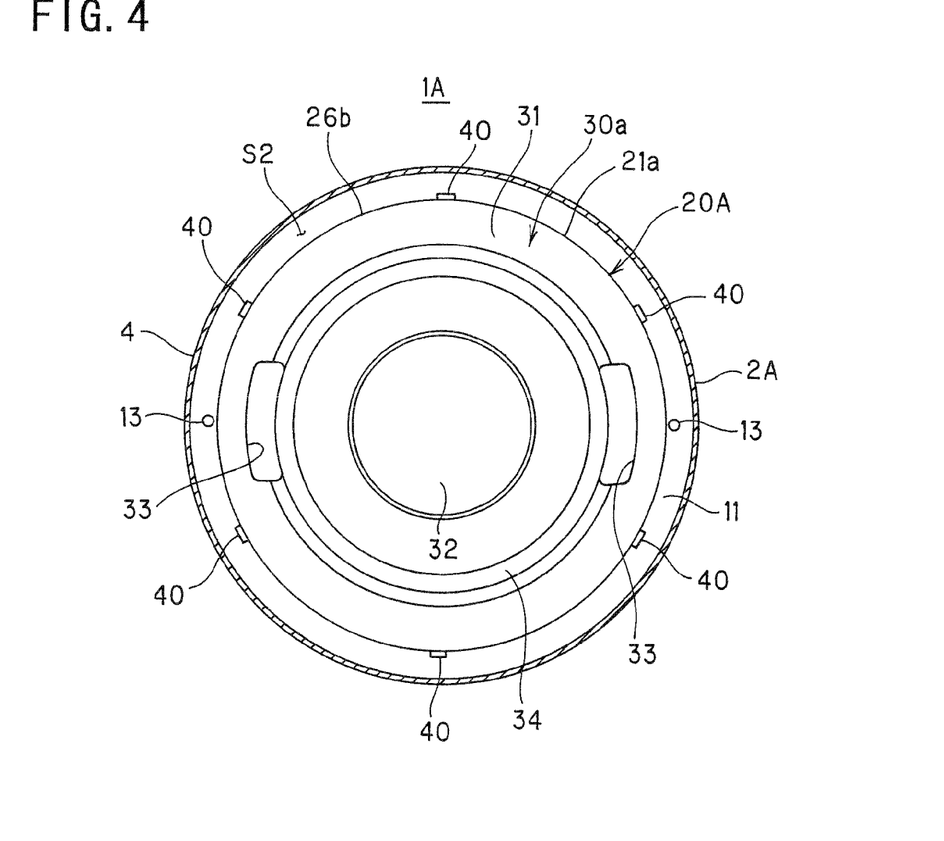
FIG. 4 is a plan view, partially in cross section, illustrating a fuel cap according to a second embodiment of the invention.

A fuel cap 1A according to the second embodiment illustrated in FIG. 4 includes an outer cap 2A serving as an outer envelope and an inner cap 10 fitted in the outer cap 2A, similarly to the fuel cap 1 according to the first embodiment. A vaporized fuel adsorption canister (hereinafter, "canister") 20A is disposed in a space S2 defined between the outer cap 2A and the inner cap 10.

Differently from the outer cap 2 according to the first embodiment, the outer cap 2A of the fuel cap 1A has a cylindrical external shape without concaves and convexes on a circumferential wall 4. The canister 20A located in the space S2 includes ribs 40 formed on the circumferential wall of a casing 30a constituting a housing 21a, projecting radially outward, and extending in a height direction of the housing 21a. The shape of the outer cap 2A of the fuel cap 1A is similar to that of the outer cap 2 of the fuel cap 1 according to the first embodiment. Further, the constituent elements of the fuel cap 1A other than the ribs 40 formed on the circumferential wall of the casing 30A of the housing 21a are similar to those of the fuel cap 1 according to the first embodiment. Therefore, the same constituent elements as those according to the first embodiment are denoted by like reference numerals in FIG. 4, and will not be described herein in detail.

In the fuel cap 1A, a plurality of ribs 40 is formed on the circumferential wall of the casing 30a constituting the housing 21A at predetermined intervals in a circumferential direction of the casing 30a. The ribs 40 are arranged over an entire height of the housing 21a.

For example, it is assumed that the housing 21a of the canister 20A is deformed by thermal expansion or that the circumferential wall 4 of the outer cap 2A is deformed to be depressed inward in the fuel cap 1A. In this case, the ribs 40 secure a clearance between the circumferential wall of the housing 21a and the circumferential wall 4 of the outer cap 2A. Furthermore, the ribs 40 are arranged over the entire height of the housing 20a. The ribs 40, therefore, secures a gas channel between a top surface 31 of the casing 30a having outlets 33 arranged therein and the inner cap 10 including introduction holes 13 in an entire range.

While an instance of including a ring-shaped projection 34 is illustrated in FIG. 4, the invention is not limited thereto.

The third embodiment of the invention is described with reference to FIG. 5 and FIG. 6.

Figure 5:
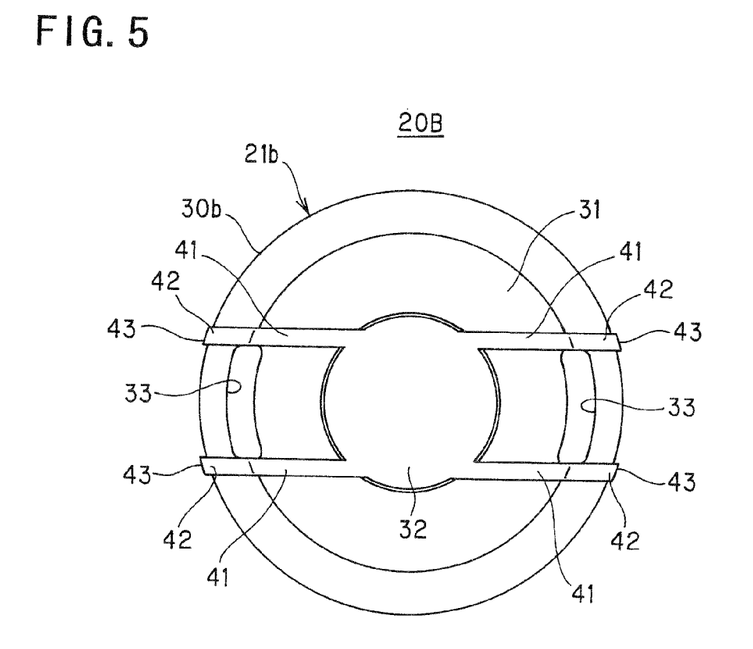
FIG. 5 is a plan view of a vaporized fuel adsorption canister used in a fuel cap according to a third embodiment of the invention.

FIG. 5 is a plan view of a vaporized fuel adsorption canister (hereinafter, "canister") 20B from above. Similarly to the first embodiment, the canister 20B includes a housing 21b and activated carbon (not illustrated) serving as an adsorbent and accommodated in the housing 21b. The housing 21b includes a casing 30b and a cap (not illustrated) that closes the open lower portion of the casing 30b. The cap includes an inlet (not illustrated) at its center similarly to the first embodiment.

The top surface 31 of the casing 30b includes a circular abutting surface 32 at its center. The abutting surface 32 abuts against the inner surface of an outer cap (not illustrated). The top surface 31 includes outlets 33 extending through the casing 30b slightly inward of the outer circumferential edge of the casing 30b. Similarly to the first embodiment, the outlets 33 are elongate holes extending in a circumferential direction of the top surface 31. The outlets 33 are located at two locations symmetric about the center of the top surface 31, respectively. Alternatively, the outlets 33 may be located at three or more locations apart from one another in the circumferential direction similarly to the first embodiment.

The top surface 31 of the casing 30b includes clearance securement projections (hereinafter, "projections") 41 as spacers located on the top surface 31. The projections 41 extend radially outward from the abutting surface 32 formed at the center of the top surface 31 and contact with longitudinal both ends of the respective outlets 33. The projections 41 located on the longitudinal both ends of the respective outlets 33 are parallel to one another. The distal ends 42 of the projections 41 reach the circumferential wall of the casing 30b. The canister 20B also includes ribs 43 formed on the circumferential wall of the casing 30b and extending in a height direction of the canister 20B. The ribs 43 protrude outward from the distal ends 42 of the respective projections 41. The projections 41 are continuous to the respective ribs 43 by an edge serving as a boundary between the top surface 31 and the circumferential wall of the casing 30b.

In the canister 20B illustrated in FIG. 5, the outlets 33 are surrounded by the abutting surface 32 located at the center of the top surface 31 of the casing 30b and a pair of projections 41. Due to this, gas flowing out from the outlets 33 does not flow into the outside of an area surrounded by the abutting surface 32 and the projections 41 in a clearance between the top surface 31 of the casing 30b and the outer cap 2. The gas is smoothly introduced into a clearance formed between the circumferential wall of the canister 20B and that of the outer cap 2.

Figure 6:
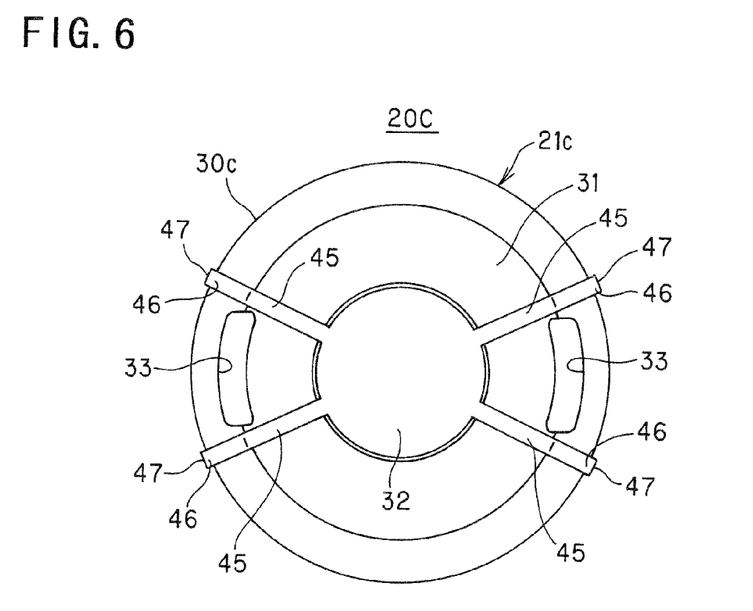
FIG. 6 is a plan view of a vaporized fuel adsorption canister according to a modification of the third embodiment illustrated in FIG. 5.

FIG. 6 illustrates a vaporized fuel adsorption canister (hereinafter, "canister") 20C according to a modification of the third embodiment illustrated in FIG. 5. The canister 20C illustrated in FIG. 6 is almost similar in basic configuration to the canister 20B illustrated in FIG. 5.

The canister 20C illustrated in FIG. 6 includes clearance securement projections (hereinafter, "projections") 45 as spacers located on the top surface 31 of a casing 30c constituting a housing 21c. The projections 45 extend radially outward from a circular abutting surface 32 formed at the center of the top surface 31. The projections 45 are arranged on longitudinal both ends of outlets 33, respectively. The projections 45 extend outward from the central abutting surface 32 at predetermined angles with respect to one another.

The canister 20C also includes ribs 47 formed on the circumferential wall of the casing 30c and extending in a height direction of the housing 21c. The ribs 47 protrude outward from the distal ends 46 of the respective projections 45. The projections 45 are continuous to the respective ribs 47 on the circumferential edge of the top surface 31 in the upper portion of the casing 30c.

In the canister 20C illustrated in FIG. 6, similarly to the canister 20B illustrated in FIG. 5, gas flowing out from outlets 33 is smoothly introduced into a clearance formed between the circumferential wall of the canister 20C and that of an outer cap 2.

Figure 7:
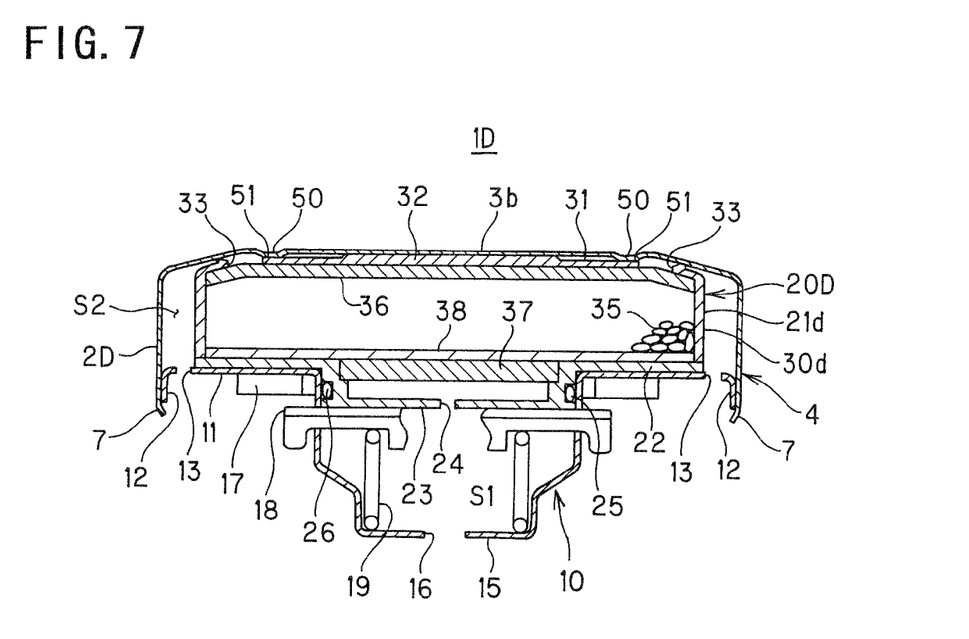
FIG. 7 is a longitudinal sectional view of a fuel cap and a vaporized fuel adsorption canister according to a fourth embodiment of the invention.

FIG. 7 illustrates a fuel cap 1D according to a fourth embodiment of the invention. In the fuel cap 1D illustrated in FIG. 7, clearance securement projections (hereinafter, "projections") 50 as spacers are located on an outer cap 2D.

The fuel cap 1D is similar in basic configuration to the fuel cap 1 according to the first embodiment. The same constituent elements of the fuel cap 1D as those of the fuel cap 1 are denoted by like reference numerals, and will not be described herein in detail.

The fuel cap 1D includes the outer cap 2D serving as an outer envelope and an inner cap 10 fitted into the outer cap 2D from the open lower portion of the outer cap 2D, similarly to the fuel cap 1 illustrated in FIGS. 1 and 2. A space S2 between the outer cap 2D and the inner cap 10 is formed inside the outer cap 2D. A vaporized fuel adsorption canister (hereinafter, "canister") 20D is disposed in the space S2. The canister 20D includes a housing 21d and activated carbon 35 serving as an adsorbent and accommodated in the housing 21d. The housing 21d includes a casing 30d having an open end and a cap 22 closing the open end of the casing 30d.

The fuel cap 1D includes the projections 50 formed on a closed surface 3b that is the upper surface of the outer cap 2D. The projections 50 are depressed inward into a ring shape on the closed surface 3b of the outer cap 2. The projections 50 are arranged slightly inward of outlets 33 in a radial direction of the canister 20D located in the housing 21d. The distal ends of the projections 50 abut against portions proximate to interiors of the respective outlets 33. The top surface 31 of the casing 30d constituting the housing 21d includes a ring-shaped receiver surface 51 on which the distal ends of the projections 50 abut.

By providing the projections 50 on the outer cap 2D as stated above, the projections 50 secure a clearance between the outer cap 2D and the canister 20D. The clearance is closed at positions of the respective projections 50, and the projections 50 introduce gas that flows out from the outlets 33 outward.

In the fourth embodiment, the instance of providing the projections 50 on the outer cap 2D has been described. Alternatively, the projections 50 may be provided on the housing 21d constituting the canister 20D.

In this manner, the projections 50 are formed on either the outer cap 2D or the housing 21d constituting the canister 20D. Alternatively, the projections 50 may be constituted by different members from those of either the outer cap 2D or the housing 21d constituting the canister 20D.

Figure 8:
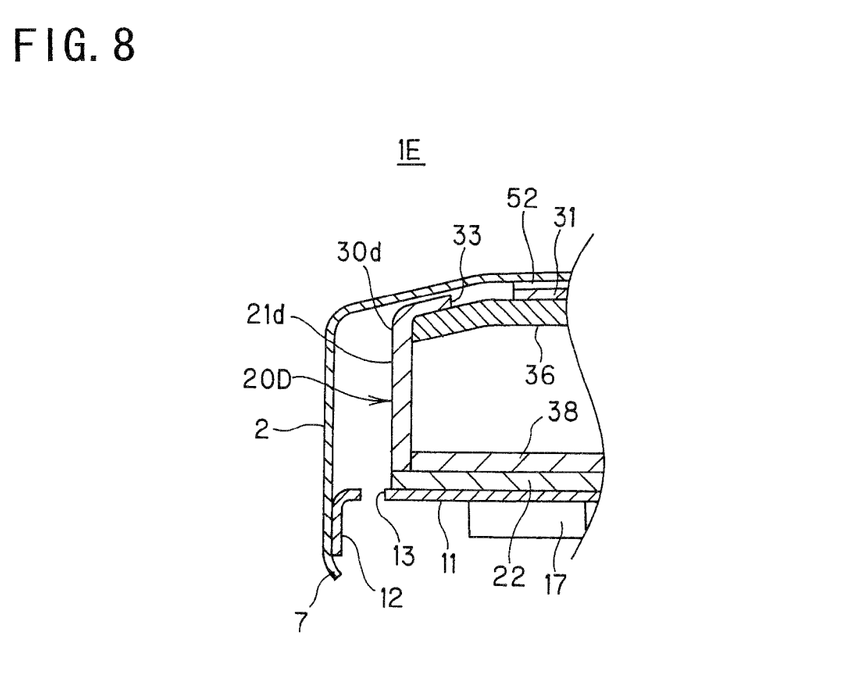
FIG. 8 is a longitudinal sectional view of a fuel cap and a vaporized fuel adsorption canister according to a fifth embodiment of the invention.

With reference to FIG. 8, a clearance securement member or spacer 52 is constituted by a different member from that of an outer cap 2D or a housing 21d constituting a canister 20D. The clearance securement member 52 is interposed between the outer cap 2D and the housing 21d. In a fuel cap 1E illustrated in FIG. 8, ring-shaped clearance securement members 52 are adhesively fitted onto either the internal surface of the outer cap 2D or the top surface 31 of the casing 30d constituting the housing 21d. In this case, the clearance securement members 52 are located proximate to respective outlets 33 formed in the top surface 31 of the casing 30d so that outer edges of the clearance securement members 52 contact with inner edges of the respective outlets 33.

In each of the fuel caps 1D and 1E illustrated in FIGS. 7 and 8, the canister 20D includes a cap 22 arranged on an inner cap 10-side and the casing 30d arranged on an outer cap 2D-side. Furthermore, an inlet 24 is formed in the inner cap 10 and the outlets 33 are formed in the top surface 31 of the casing 30d. However, the invention is not limited to the instances. Alternatively, the direction of the canister 20D may be inverted, the cap 22 may be arranged on the outer cap 2D-side, the casing 30d may be arranged on the inner cap 10-side, the inlet 24 may be formed in the casing 30d, and the outlets 33 may be formed in the inner cap 10. In this case, the inlet 24 may be formed at the center of the casing 30d and the outlets 33 may be formed at positions slightly inward of the circumferential edge of the inner cap 10.

In the first to fourth embodiments, the instances have been described, in which the communication holes 13 allowing the space formed between the outer cap and the inner cap to communicate with the air are formed in the inner cap. Alternatively, the communication holes 13 may be formed in the outer cap or in both the inner cap and the outer cap. Needless to say, formation of the communication holes 13 in the inner cap as described in the first to fourth embodiments effectively prevents invasion of rainwater into the space.

EXPERIMENTAL EXAMPLE

The following test was conducted to confirm the effects of the invention.

Figure 9A:
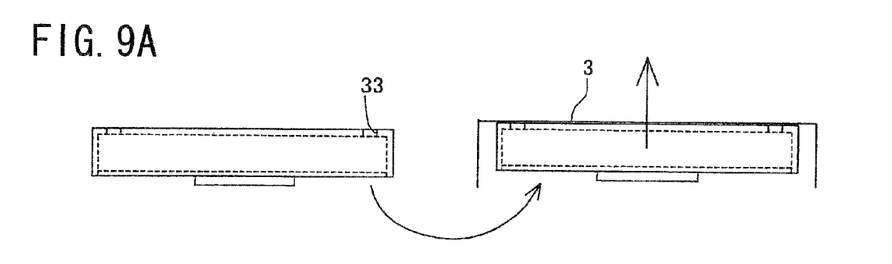
FIGS. 9A, 9B and 9C are diagrams illustrating test samples used for confirming effects of the invention.
Figure 9B:
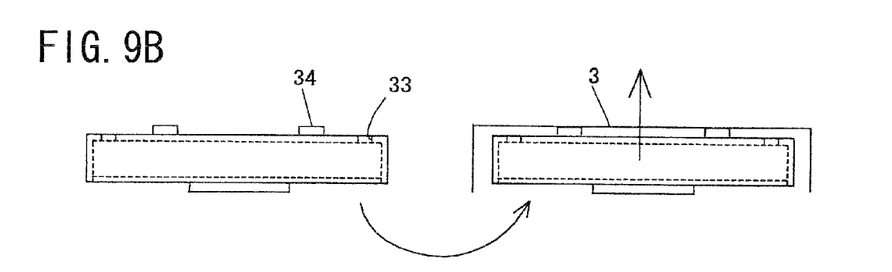
Figure 9C:
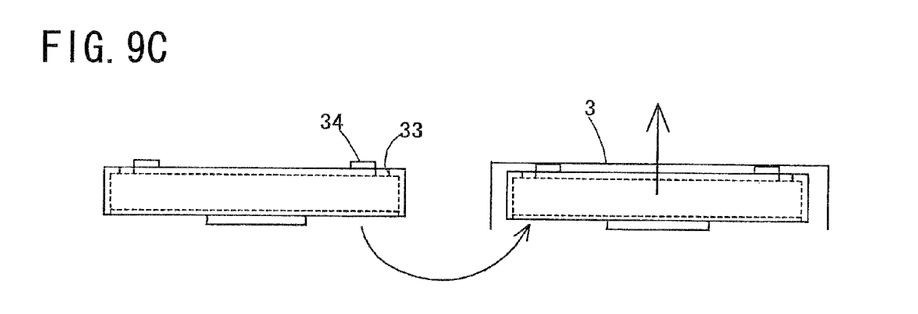

It is a ventilation test using test samples 1 to 3. In the test sample 1, the projections are not formed in the housing of the canister. In the test sample 2, the projections 34 are formed inside of the canister slightly apart from the respective outlets 33 of the housing. In the test sample 3, the projections 33 are formed proximate to the respective outlets 33. In the ventilation test, ventilation resistance was measured while changing an indentation amount of the canister with respect to the outer cap 3. FIGS. 9A to 9C illustrate outline of the ventilation test. FIG. 9A illustrates the test sample 1, FIG. 9B illustrates the test sample 2, and FIG. 9C illustrates the test sample 3.

Figure 10:
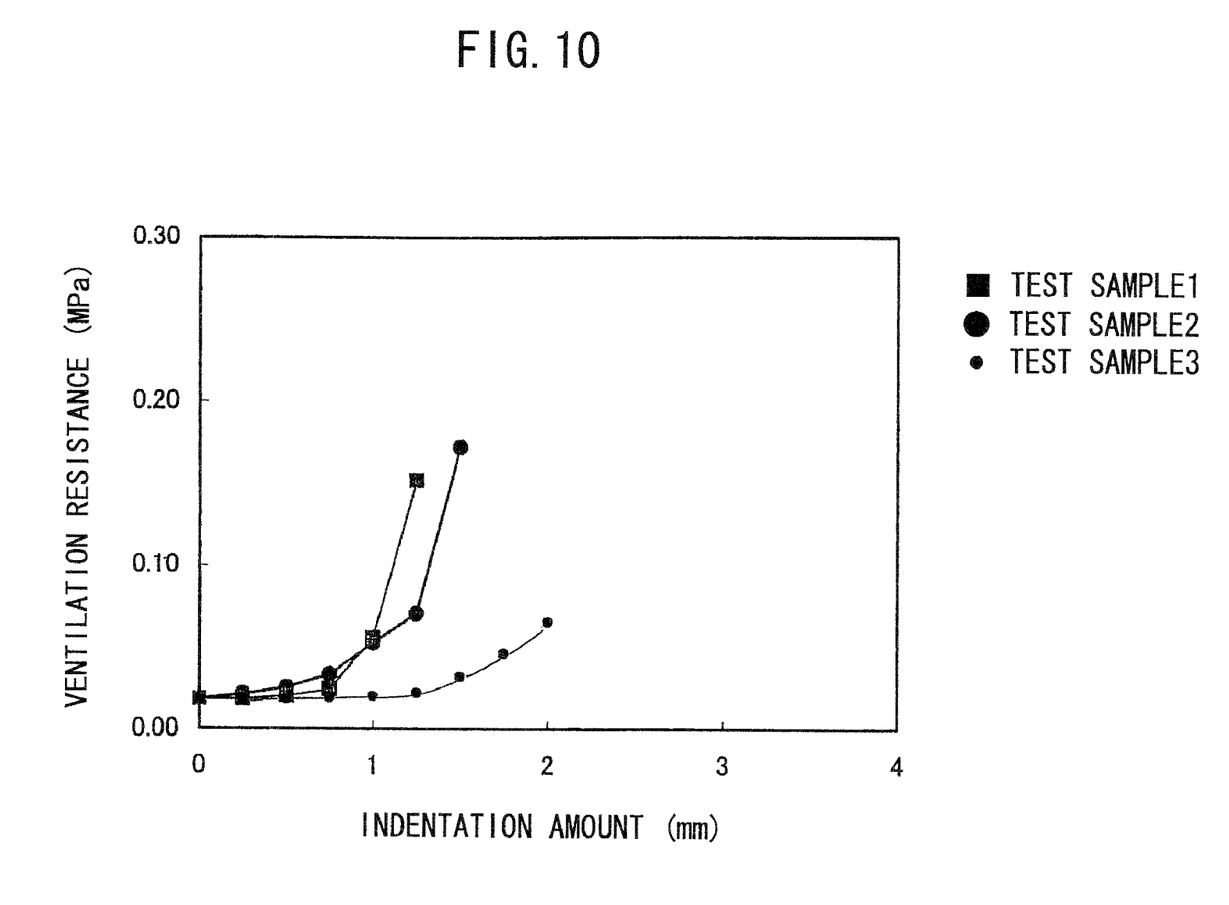
FIG. 10 is a graph of a relation between an indentation amount of a vaporized fuel adsorption canister with respect to an outer cap and ventilation resistance, illustrating a test result.

FIG. 10 is a graph of a test result. In the graph of FIG. 10, a horizontal axis indicates the indentation amount of the canister with respect to the outer cap 3 and a vertical axis indicates the ventilation resistance. As illustrated in the graph of FIG. 10, in case of the test sample 3, the ventilation resistance did not greatly rise although the indentation amount of the canister increased. On the other hand, in case of the test samples 1 and 2, the ventilation resistances suddenly rose, respectively when the indentation amounts neared 1 millimeter.

The test result indicates that the fuel cap according to the invention ensures that the gas flows out of the canister without closing the outlets 33.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

According to the invention, the clearance securement member secures a clearance between the outer cap and said another end surface having the outlet. Therefore, the outlet is not closed by the outer cap, and the gas after the fuel adsorption smoothly flows out of the canister. The gas is discharged from the communication hole of the fuel cap, preventing inner pressure of the tank from increasing.

Integral formation of the clearance securement member with the housing of the canister or formation of the clearance securement member to the outer cap by press working the outer cap allows the fuel cap according to the invention to reduce the number of components.

Regarding the canister, the inlet may be formed at a radial center portion of the housing, and the outlet may be displaced outward of the center portion, for example, be formed slightly inside of the periphery. Therefore, the flown-in vaporized fuel disperses into the interior of the canister to travel to the outlet, which allows the accommodated adsorbent to be uniformly used.

In this case, formation of the clearance securement member inside of the outlet allows the flown-out gas to be effectively led radially outward of the canister. That is, the communication hole communicating with air is formed to the inner cap, allowing the flown-out gas to smoothly travel round to the outside of the canister, smoothly leading the gas to the communication hole of the inner cap. The operation allows the gas free from the fuel to be discharged into air, thus preventing a tank inner pressure from rising.

What is claimed is:

1. A fuel cap comprising:

an outer cap as an outer envelope;

an inner cap removably fitted in the outer cap through an opening of the outer cap; and a canister located in a space between the outer cap and the inner cap for adsorbing a vaporized fuel, the fuel cap closing a fuel filler port for feeding a fuel to a fuel tank, the canister adsorbing a vaporized fuel vaporized from the fuel in the fuel tank, at least one of the outer cap and the inner cap defining a communication hole communicating with the space and an exterior, the canister including a housing; and an adsorbent accommodated in the housing, the housing defining, on an end surface directed to the inner cap, an inlet for a vaporized fuel to flow into the inlet, the housing defining, on another end surface directed to an inner surface of the outer cap, an outlet for a gas, from which the vaporized fuel has been absorbed, to flow out of the outlet, said another end surface of the housing contacting said inner surface of the outer cap, said inner surface of the outer cap and said another end surface of the housing having a clearance securement member as a spacer interposed therebetween and located proximate to the outlet, the clearance securement member securing a clearance between said inner surface of the outer cap and said another end surface of the housing, said clearance connecting the outlet and the communication hole each other.

2. The fuel cap according to claim 1, wherein the clearance securement member includes a projection projecting from one of the inner surface of the outer cap and said another end surface of the housing toward the other one thereof.

3. The fuel cap according to claim 1,
wherein the inlet is located at a radial center portion of the housing,
wherein the outlet is displaced radially outside of the center portion of the housing.

4. The fuel cap according to claim 1,
wherein the clearance securement member is positioned slightly inside of the outlet in a radial direction of the housing.

5. The fuel cap according to claim 1,
wherein the housing has a circumferential wall having a rib extending in a height direction of the housing, the rib projecting radially outside of the housing.

6. The fuel cap according to claim 1,
wherein the housing has a circumferential wall extending between said end surface and said another end surface, and the circumferential wall is off said inner surface of the outer cap to communicate with the outlet and the communication hole.

7. The fuel cap according to claim 1,
wherein said another end surface of the housing contacts said inner surface of the outer cap radially inside of the outlet.

* * * * *